(12) United States Patent
Wilborn et al.

(10) Patent No.: US 8,275,324 B2
(45) Date of Patent: Sep. 25, 2012

(54) METHOD AND APPARATUS FOR PREDICTING RECEIVED SIGNAL STRENGTH IN A COMMUNICATION SYSTEM

(75) Inventors: Thomas B. Wilborn, San Diego, CA (US); William R. Gardner, San Diego, CA (US); Steven M. Mollenkopf, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2179 days.

(21) Appl. No.: 10/007,942

(22) Filed: Nov. 2, 2001

(65) Prior Publication Data

US 2003/0087657 A1    May 8, 2003

(51) Int. Cl.
*H04B 17/00* (2006.01)
*H04B 7/00* (2006.01)
*H04Q 11/12* (2006.01)

(52) U.S. Cl. ..... 455/69; 455/127.2; 455/506; 455/67.13

(58) Field of Classification Search .................. 455/522, 455/69, 68, 115.1, 127.1, 67.11, 226.1, 226.2, 455/67.13, 63.1, 52; 370/342, 311, 335, 370/310
See application file for complete search history.

(56) References Cited

U.S. PATENT DOCUMENTS

| | | | | |
|---|---|---|---|---|
| 5,056,109 A * | 10/1991 | Gilhousen et al. | ............ | 370/342 |
| 5,305,468 A * | 4/1994 | Bruckert et al. | ................ | 455/69 |
| 5,336,695 A | 8/1994 | Nass et al. | ................ | 521/109.1 |
| 5,345,598 A * | 9/1994 | Dent | .............................. | 455/522 |
| 5,379,445 A * | 1/1995 | Arnstein et al. | ............. | 455/13.4 |
| 5,564,080 A * | 10/1996 | Eul et al. | ........................... | 455/69 |
| 5,574,983 A * | 11/1996 | Douzono et al. | ................ | 455/69 |
| 5,604,766 A * | 2/1997 | Dohi et al. | ..................... | 375/130 |
| 5,793,805 A | 8/1998 | Nikides | | |
| 5,844,013 A | 12/1998 | Kenndoff et al. | ............ | 521/137 |
| 5,845,208 A | 12/1998 | Hottinen et al. | | |
| 6,035,181 A * | 3/2000 | Gross | ......................... | 455/127.2 |
| 6,166,598 A * | 12/2000 | Schlueter | ...................... | 330/127 |
| 6,324,387 B1 * | 11/2001 | Kamgar et al. | ............ | 455/234.1 |
| 6,389,296 B1 * | 5/2002 | Shiraki et al. | .................. | 455/522 |
| 6,493,541 B1 * | 12/2002 | Gunnarsson et al. | ............. | 455/69 |
| 6,532,357 B1 * | 3/2003 | Ichikawa | ...................... | 455/126 |
| 6,574,459 B1 * | 6/2003 | Kaminski et al. | ............. | 455/272 |
| 6,675,021 B2 * | 1/2004 | Shiraki et al. | .................. | 455/522 |
| 6,707,862 B1 * | 3/2004 | Larsson | ........................ | 375/326 |

(Continued)

FOREIGN PATENT DOCUMENTS

DE    41 11 098    10/1992

(Continued)

OTHER PUBLICATIONS

Patent Abstracts of Japan, Publication No. 06248242 A, Tokumaro et al., Sep. 6, 1994 "Peelable Foamed Adhesive Sheet".

(Continued)

*Primary Examiner* — Tilahun B Gesesse
(74) *Attorney, Agent, or Firm* — Howard H. Seo; S. Hossain Beladi

(57) ABSTRACT

A method, apparatus and computer program product for predicting received signal strength in a wireless mobile receiver. The invention bounds the range of allowed values for a next predicted signal. The bounded prediction compensates for erroneous values from multipath fading. The predicted signal strength is used to set the mobile receiver amplifier gain to the desired level.

10 Claims, 8 Drawing Sheets

U.S. PATENT DOCUMENTS

2002/0115461 A1* 8/2002 Shiraki et al. ................. 455/522
2004/0014441 A1* 1/2004 Piirainen et al. ........... 455/127.1

FOREIGN PATENT DOCUMENTS

| DE | 42 33 289 | 4/1994 |
| EP | 0462952 | 12/1991 |
| EP | 1124340 | 8/2001 |
| JP | 04-330183 | 11/1992 |
| JP | 09-284073 | 10/1997 |
| WO | WO 88/01878 | 3/1988 |
| WO | 0137447 | 5/2001 |

OTHER PUBLICATIONS

International Search Report—PCT/US02/035275. International Searching Authority—European Patent Office, Feb. 14, 2003.
International Preliminary Examination Report—PCT/US02/035275—IPEA/US, Jun. 26, 2003.

* cited by examiner

METHOD AND APPARATUS FOR PREDICTING RECEIVED SIGNAL STRENGTH IN A COMMUNICATION SYSTEM

BACKGROUND OF THE INVENTION

1. Field of the Invention

The present invention relates to wireless telecommunications. More particularly, the present invention relates to a method of predicting received signal strength in a discontinuous radio transmission system.

2. Background Art

The present invention is directed particularly to discontinuous radio transmission systems. One such system in common use is known as GSM. In 1982, a study group called the Groupe Spécial Mobile (GSM) was formed to study and develop a pan-European public land mobile system. In 1990, phase I of the GSM specifications were published. Commercial service was started in mid-1991, and by 1993 there were 36 GSM networks in 22 countries. Although standardized in Europe, GSM is not only a European standard. Over 200 GSM networks (including DCS1800 and PCS1900) are operational in 110 countries around the world. In the beginning of 1994, there were 1.3 million subscribers worldwide, which had grown to more than 55 million by October 1997. With North America making a delayed entry into the GSM field with a derivative of GSM called PCS1900, GSM systems exist on every continent, and the acronym GSM now aptly stands for Global System for Mobile communications.

The GSM network can be divided into three broad parts. The mobile station is carried by the subscriber. The base station subsystem controls the radio link with the mobile station. The network subsystem, the main part of which is the mobile services switching center, performs the switching of calls between the mobile users, and between mobile and fixed network users.

Since radio spectrum is a limited resource shared by all users, a method must be devised to divide up the bandwidth among as many users as possible. The method chosen by GSM is a combination of Time- and Frequency-Division Multiple Access (TDMA/FDMA). One or more carrier frequencies are assigned to each base station. Each of these carrier frequencies is then divided in time, using a TDMA scheme. The fundamental unit of time in this TDMA scheme is called a burst period and it lasts 15/26 ms. Eight burst periods are grouped into a TDMA frame, which forms the basic unit for the definition of logical channels. One physical channel is one burst period per TDMA frame.

Minimizing co-channel interference in a cellular system allows better service for a given cell size, or the use of smaller cells, thus increasing the overall capacity of the system. Discontinuous transmission (DTX) is a mode of operation that takes advantage of the fact that a person speaks less that 40 percent of the time in normal conversation, by turning the transmitter off during silence periods. Reducing the transmission time through DTX reduces co-channel interference. An added benefit of DTX is that power is conserved at the mobile unit.

Another method used to conserve power at the mobile station is discontinuous reception. The paging channel, used by the base station to signal an incoming call, is structured into sub-channels. Each mobile station needs to listen only to its own sub-channel. In the time between successive paging sub-channels, the mobile can go into sleep mode, when almost no power is used.

A common implementation of a mobile station receiver has an analog section that amplifies the received signal such that it can be quantized with minimal quantization or saturation noise. The amount of amplification required is inversely proportional to the received signal power.

In a DTX system the mobile station does not know the signal strength of the next received signal. The signal strength or received power must be predicted to correctly set the level of receiver amplification. Using the last received signal power to set receiver amplification could cause excessive saturation or quantization noise.

At the assigned 900 MHz frequency band, GSM radio waves bounce off objects such as buildings, hills, cars, airplanes, etc. Thus many reflected signals, each with a different phase, can reach an antenna. The interference caused by these reflected signals is known as multipath fading.

One of the variables affecting received power is the multipath fading that occurs in the GSM radio frequency channel. Multipath fading follows a Rayleigh distribution, if only locally reflected waves are taken into account, and therefore multipath fading is frequently called Rayleigh fading.

Rayleigh fading has the property of having larger attenuation, but for a shorter duration, than gain relative to its mean. The previously received signal may have been subject to large attenuation (known as a deep fade) because of Rayleigh fading. Therefore, this power level is not a good estimate of the next signal to be received.

What is needed is a simple and reliable method to predict the power of a next received signal. The method should be applicable to a discontinuous transmission system and mitigate the previously discussed errors.

BRIEF SUMMARY OF THE INVENTION

The invention comprises a method and apparatus to predict the next received signal strength in a discontinuous transmission system. The method measures the currently received signal power, then calculates the difference between the currently received power and a predicted power. This difference is compared with a preselected value. If the difference is greater than the preselected value, the next predicted power is set equal to the current predicted power minus the preselected value. If the difference is less than the preselected value, the next predicted power is set equal to the current received power. The next predicted power is used to set the gain of an amplifier.

The predictor comprises a slew limit selector, a comparator, a delay and a gain selector. The predictor sets a positive and a negative slew limit on the next predicted power based on an allowed change between consecutively received signals. The output of the predictor, next predicted power, is used to set receiver gain for the next received signal.

The invention also comprises a computer usable medium having computer readable program code means for causing an application program to predict a next received signal power, and then set the gain of a low noise amplifier based on the next predicted power.

The foregoing and other features and advantages of the invention will be apparent from the following, more particular description of a preferred embodiment of the invention, as illustrated in the accompanying drawings.

BRIEF DESCRIPTION OF THE FIGURES

In the figures, the left most digit of each reference number indicates the number of the figure in which the number is first referenced.

DETAILED DESCRIPTION OF THE INVENTION

Figure 1:
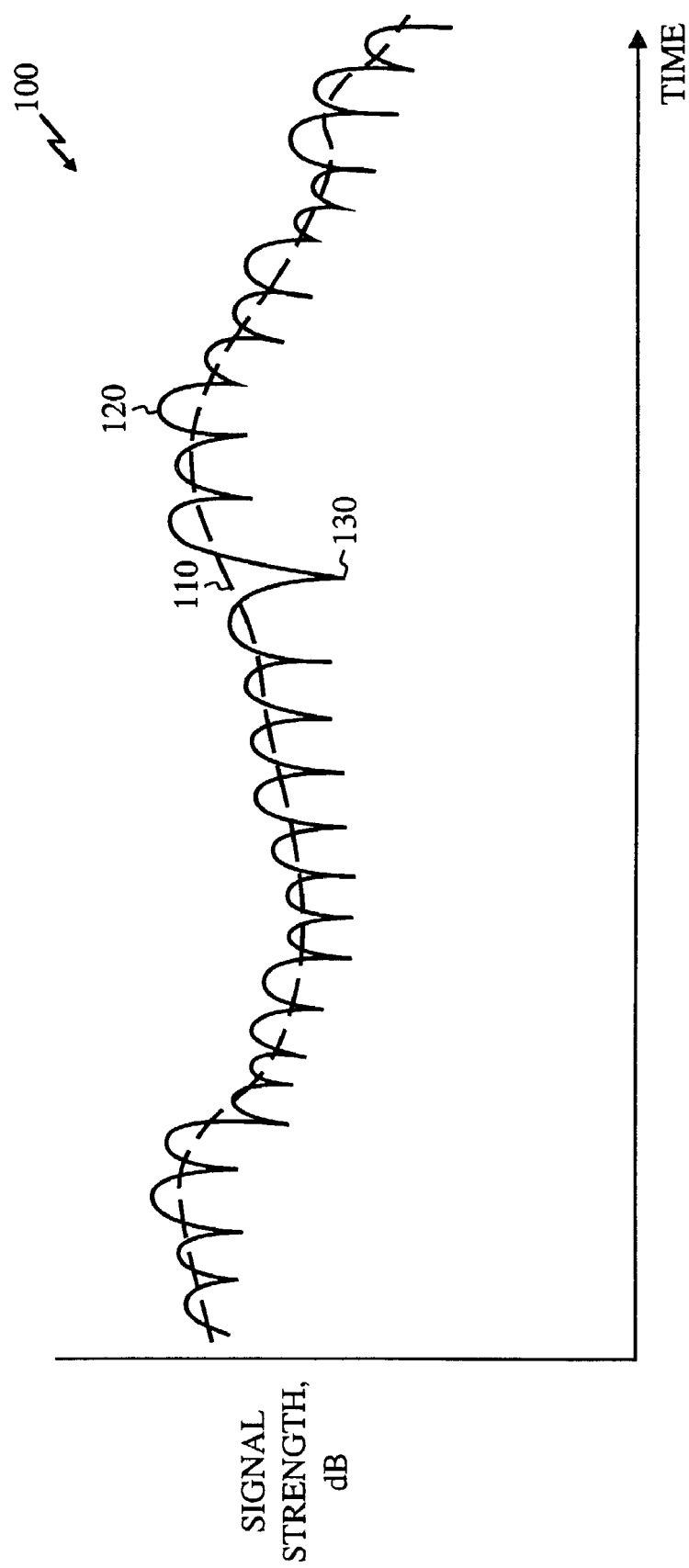
FIG. 1 illustrates the fading characteristics of a mobile radio signal.

FIG. 1 illustrates a mobile radio signal 100. Mobile radio signal 100 is artificially characterized by two components based on natural phenomena. A local mean 110 represents the variation due to terrain contour between the base station and the mobile station. A multipath fading 120 is caused by the radio waves reflected from surrounding buildings and other structures. Multipath fading 120 is often called Rayleigh fading. A deep fade 130 is caused by characteristics of a Rayleigh distribution and can cause sudden, short duration decreases in the mobile radio received signal power.

One method of predicting a next received signal would assume that the power in the next received signal is equal to the previous signal's power without Rayleigh fading plus the expected value of the Rayleigh fading attenuation. Unfortunately the mobile station cannot accurately estimate the power in the previously received signal without fading by simply taking the mean of the powers in a number of previously received signals. The number of signals sampled would be so large that the mean would no longer be close to the actual value because, even without Rayleigh fading, the power in the received signal changes with time. However, if the predictor is only allowed to decrease a predetermined limit per update, then a deep fade would cause the predicted signal to lose only the predetermined value of gain in the next receive period, rather than the full magnitude of the deep fade.

An algorithm limiting a change in output regardless of the change in input, is known as slew-rate limiting. The example above, where the algorithm limits the predictor from decreasing too quickly is known as negative slew rate limiting. The algorithm can also limit the predictor output from increasing too quickly. This is known as positive slew rate limiting. The positive slew rate limit can be greater than the negative limit to allow the predictor algorithm to return from deep fade 130 or a series of deep fades to a value closer to local mean 110 after fewer prediction iterations.

The optimal value of a slew limit depends upon the time between signal transmissions, properties of the radio channel, the mobile station's speed, and other factors that cause signal power to change over time. If the positive slew limit is set too large, then the receiver saturation noise will increase. If the positive slew limit is too small, then not enough amplification is applied by the mobile station, increasing the quantization noise. If the negative slew limit is set too large, then the receiver quantization noise will increase and if the negative slew limit is set too small, then the receiver saturation noise will increase.

Figure 2A:
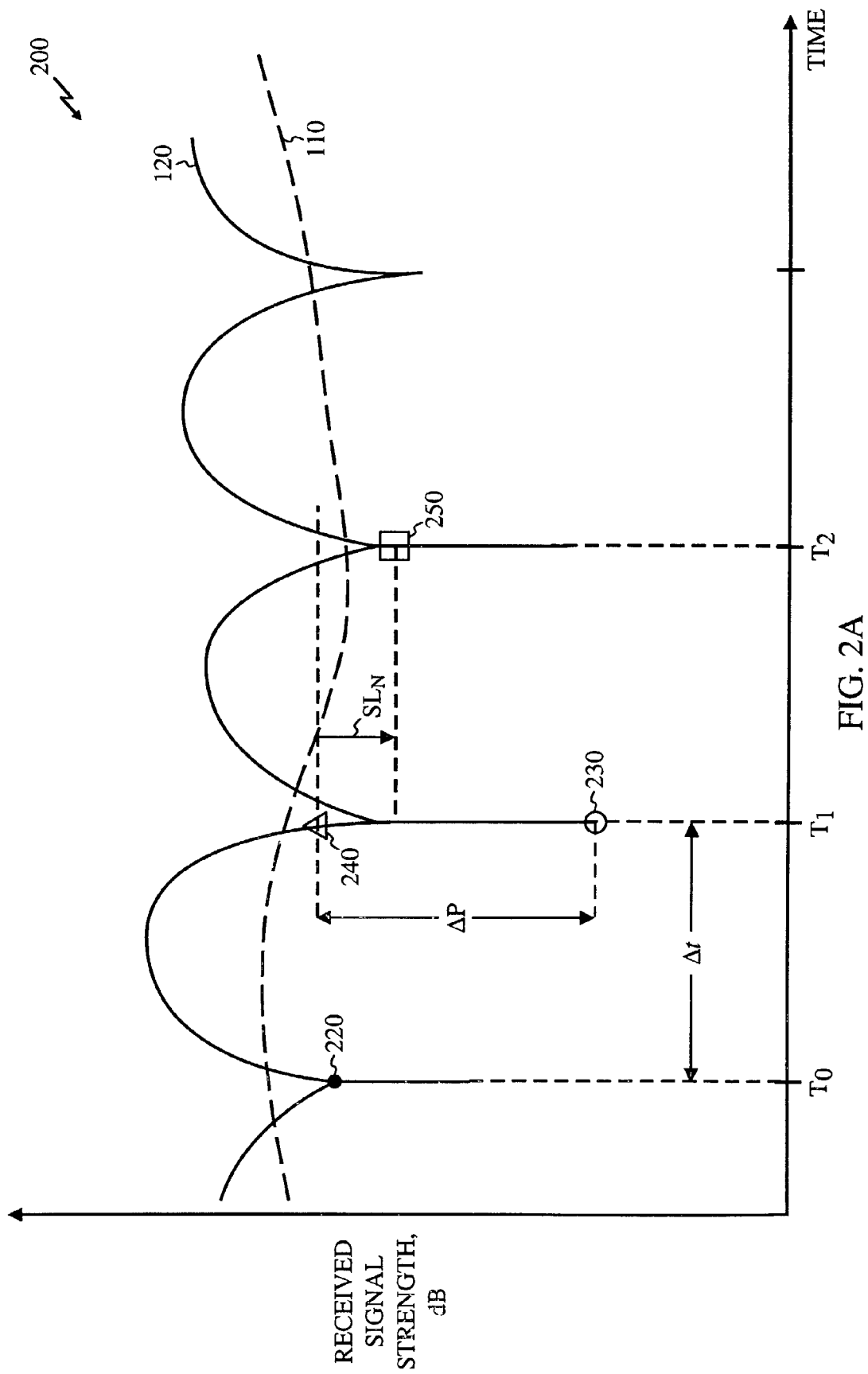
FIG. 2A illustrates details of negative slew limited signal prediction.

FIG. 2A illustrates negative slew rate limiting 200 on mobile radio signal 100. At time $T_0$ a previously predicted power 220 is delayed by a time )t to be a current predicted power 240 at a time $T_1$. At time $T_1$ a current received power 230 is measured. Current received power 230 is compared with current predicted power 240 to determine a power difference )P. A negative slew limit $SL_N$ is predetermined and set to the value required to minimize receiver saturation and quantization noise. If power difference )P is greater than negative slew limit $SL_N$ then a next predicted power 250 for a time $T_2$ is set equal to current predicted power 240 less negative slew limit $SL_N$. If power difference )P is less than or equal to negative slew limit $SL_N$ then next predicted power 250 is set equal to current received power 230.

Figure 2B:
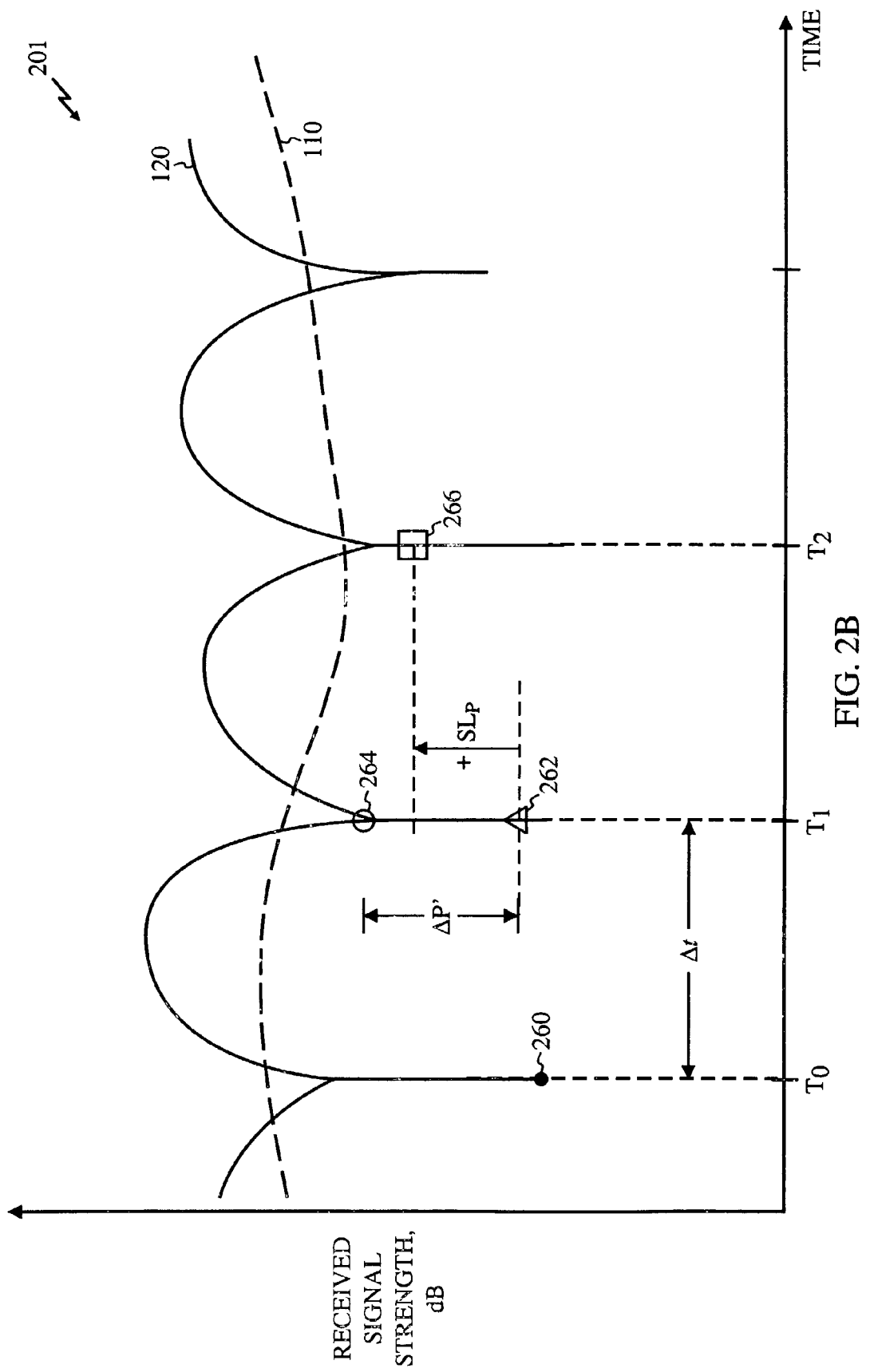
FIG. 2B illustrates details of positive slew limiting signal prediction.

FIG. 2B illustrates positive slew rate limiting 201 on mobile radio signal 100. At time To previously predicted power 260 is delayed by a time )t to be current predicted power 262 at time $T_1$. At time $T_1$ current received power 264 is measured. Current received power 264 is compared with current predicted power 262 to determine power difference )PN. Positive slew limit $SL_P$ is predetermined and set to a value allowing next predicted power 266 to rapidly recover towards signal mean 110 after a series of deep fades. If power difference )PN is greater than positive slew limit $SL_P$ then next predicted power 266 for time $T_2$ is set equal to current predicted power 262 plus positive slew rate limit $SL_P$. If power difference )PN is less than or equal to positive slew limit $SL_P$ then next predicted power 266 is set equal to current received power 264.

Figure 3A:
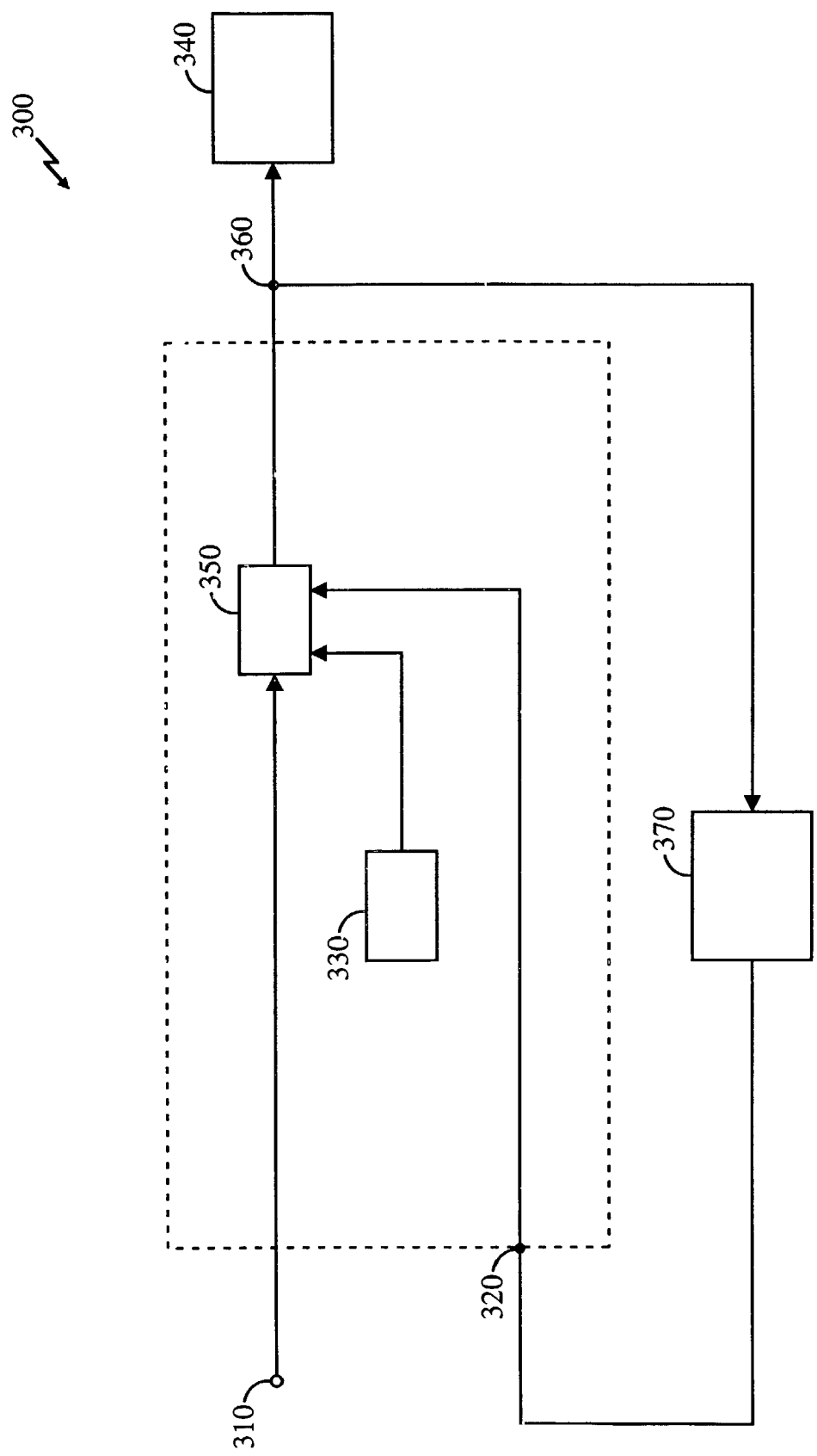
FIG. 3A illustrates an embodiment of the predictor circuit.

FIG. 3A illustrates a predictor circuit 300, for predicting received signal power. Predictor 300 comprises a comparator 350 coupled to a current received power input 310, to a current predicted power input 320, to a next predicted power output 360 and to a slew limit selector 330. Next predicted power output 360 is coupled to an amplifier gain selector 340 and a delay 370. Delay 370 is coupled to current predicted power input 320. Slew limit selector 330 sends a signal representing positive slew limit $SL_P$ and a signal representing negative slew limit $SL_N$ to comparator 350. Comparator 350 subtracts current received power 230 at current received power input 310 from current predicted power 240 or 262 at current predicted power input 320. The result is power difference )P or )PN.

If current received power 230 is less than current predicted power 240 and power difference )P is greater than negative slew limit $SL_N$, comparator 350 sets next predicted power 250 equal to current predicted power 240 less negative slew limit $SL_N$. Comparator 350 sends next predicted power 250 to next predicted power output 360. If power difference )P is less than or equal to negative slew limit $SL_N$ comparator sets next predicted power 250 equal to current received power 240 and sends current received power 240 to next predicted output 360 and gain selector 340.

If current received power 264 is greater than current predicted power 262 and power difference )PN is greater than positive slew limit $SL_P$, comparator 350 sets next predicted power 266 equal to current predicted power 262 plus positive slew limit $SL_P$ and sends next predicted power 266 to next predicted power output 360 and gain selector 340. If power difference )PN is less than or equal to positive slew limit $SL_P$, comparator 350 sets next predicted power 266 equal to current received power 264 and sends next predicted power 266 to next predicted power output 360 and gain selector 340.

Figure 3B:
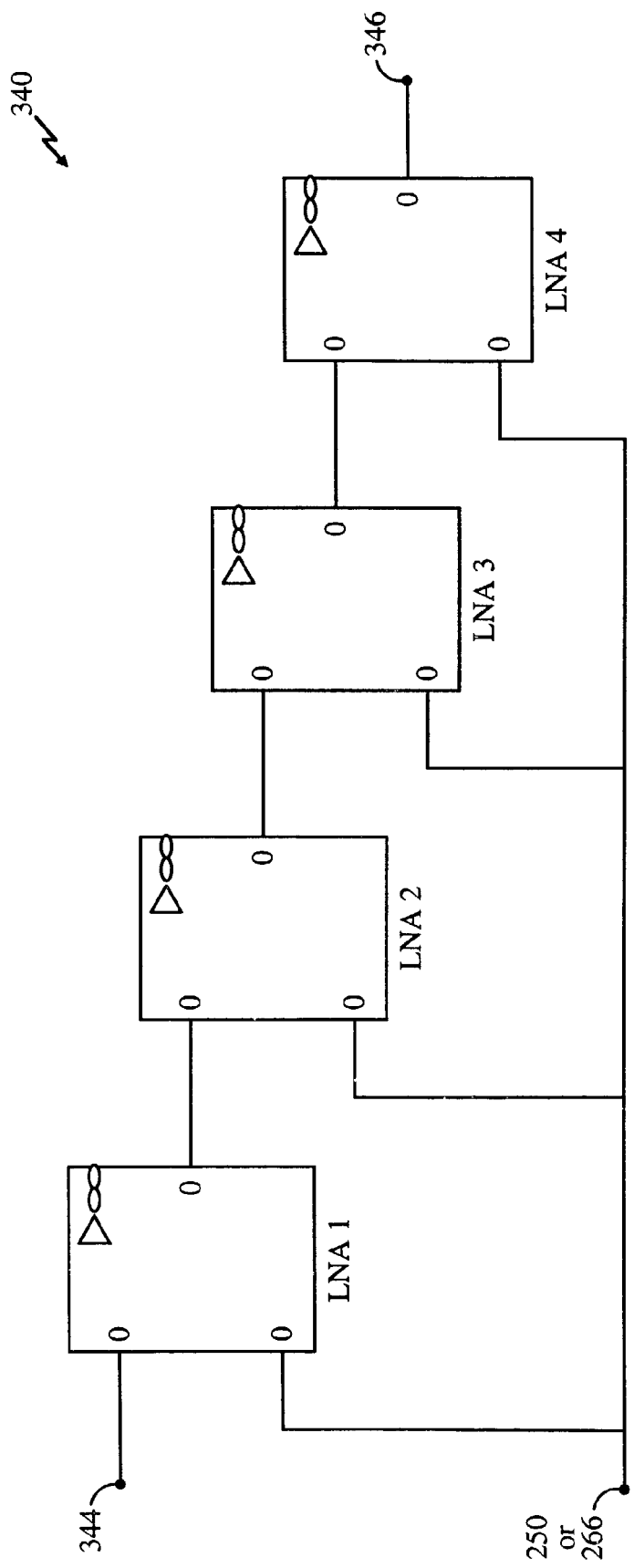
FIG. 3B illustrates an embodiment of the gain selector

FIG. 3B illustrates details of amplifier gain selector 340. Amplifier gain selector 340 comprises an amplifier input 344 coupled to the input of a low noise amplifier LNA 1. The output of LNA 1 is coupled to the input of an LNA 2, the output of LNA 2 is coupled to the input of an LNA 3 and the output of LNA 3 is coupled to the input of an LNA 4. The output of LNA 4 is coupled to an amplifier output 346. Next predicted power 250 or 266 is coupled into the gain state inputs of LNA 1, LNA 2, LNA 3, and LNA 4. Next predicted power 250 or 266 sets the gain state of each amplifier. The aggregate gain of LNA 1, LNA 2, LNA 3, and LNA 4 determines the gain between amplifier input 344 and amplifier output 346. For example, if the required receiver gain for the next received radio signal was 10, next predicted power 250 or 266 would set the gain state of LNA 1 to 1, LNA 2 to 1, LNA 3 to 1, and LNA 4 to 10. The resulting receiver gain between 344 and 346 is 10. Other embodiments of gain selector 340 have a different number of gain stages. The gain of these alternate embodiments is responsive to next predicted power 250 or 266.

A preferred embodiment of predictor 300 comprises comparator 350 and slew limit selector 330 implemented as software functions. Additional embodiments can be implemented using hardware components to provide the functionality disclosed. One of skill in the art will understand how to provide the disclosed functionality in either hardware and software.

Figure 4:
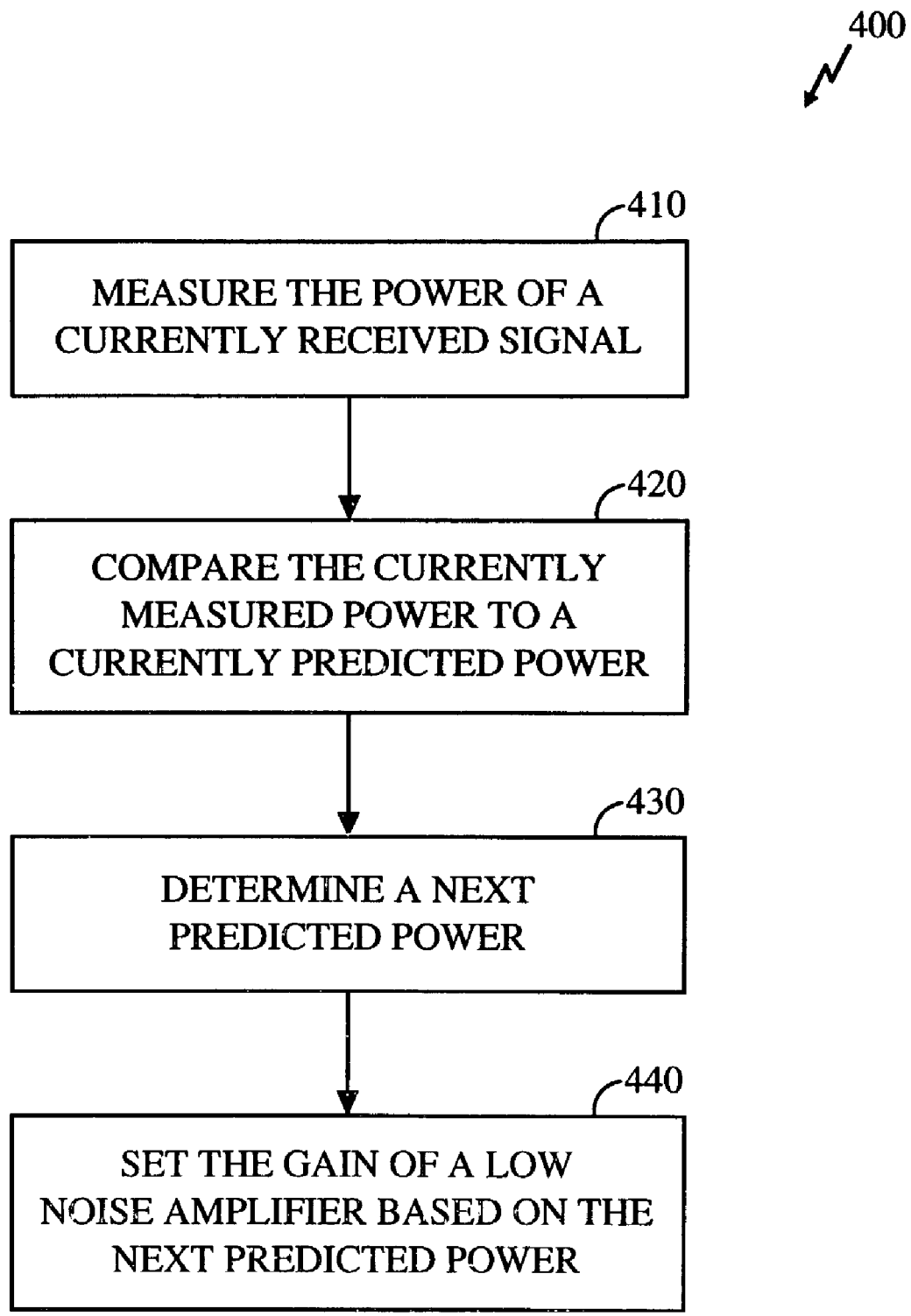
FIG. 4 is a flow chart illustrating a method of predicting a next received signal and setting an amplifier gain.

FIG. 4 illustrates a method of predicting a next received power 400 according to the present invention. In step 410, the power of a current received signal is measured. In step 420, the current received power is compared to a current predicted power. In step 430, a next predicted power is determined. In step 440, the gain of a low noise amplifier is set based on the next predicted power.

Figure 5:
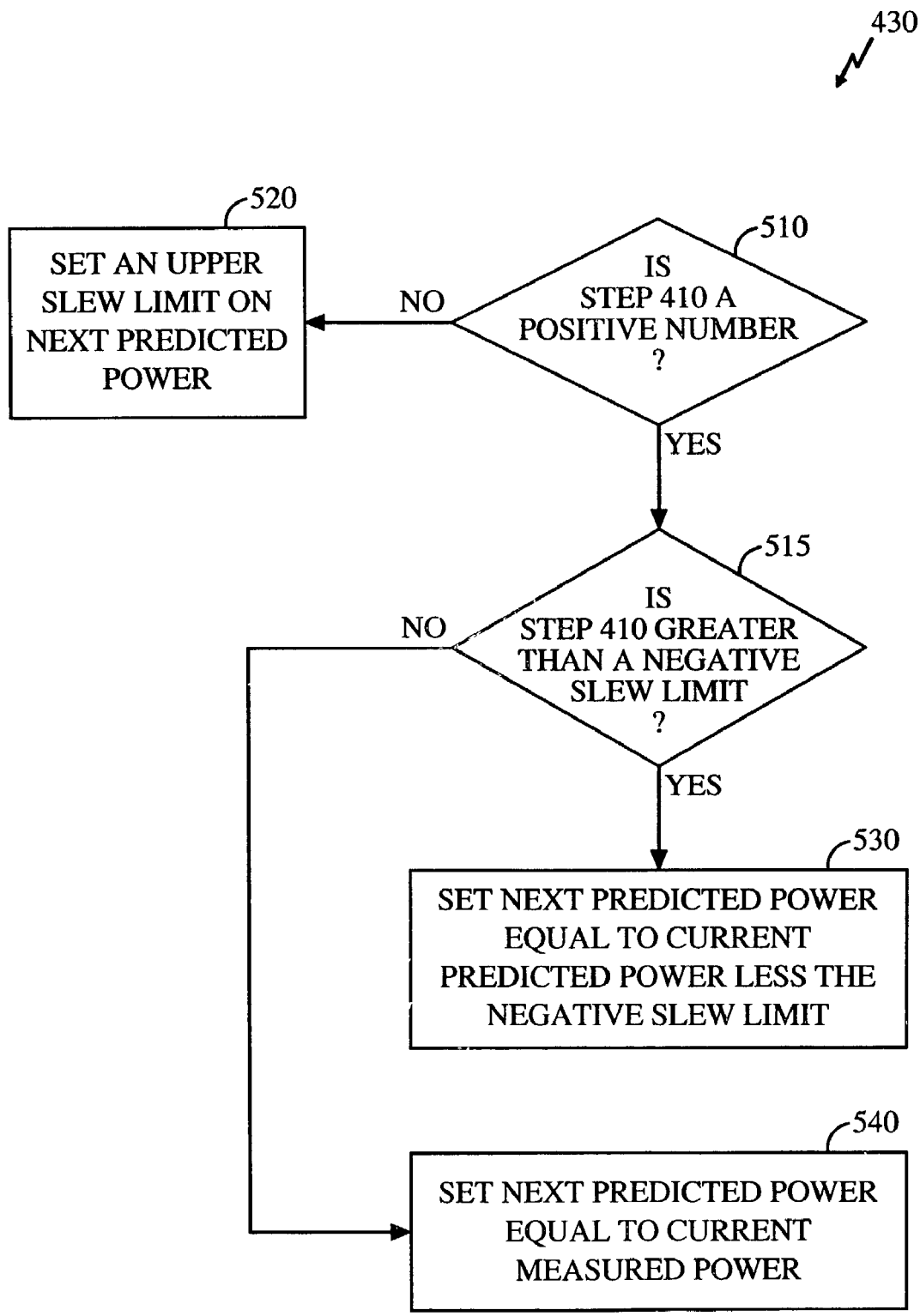
FIG. 5 is a flow chart illustrating details of determining a next predicted power where a lower slew limit is used.

FIG. 5 illustrates details of step 430. In step 510, if the result of step 410 is positive then step 515 is performed. If the result of step 410 is negative then step 520 is performed. In step 520, an upper slew limit is set. In step 515, the result of step 410 is compared to the negative slew limit. If the result of step 410 is greater than the negative slew limit then step 530 is performed. If the result of step 410 is less than the negative slew limit then step 540 is performed. In step 530, the nest predicted power is set equal to the current predicted power less a negative slew limit. In step 540, the next predicted power is set equal to the current received power.

Figure 6:
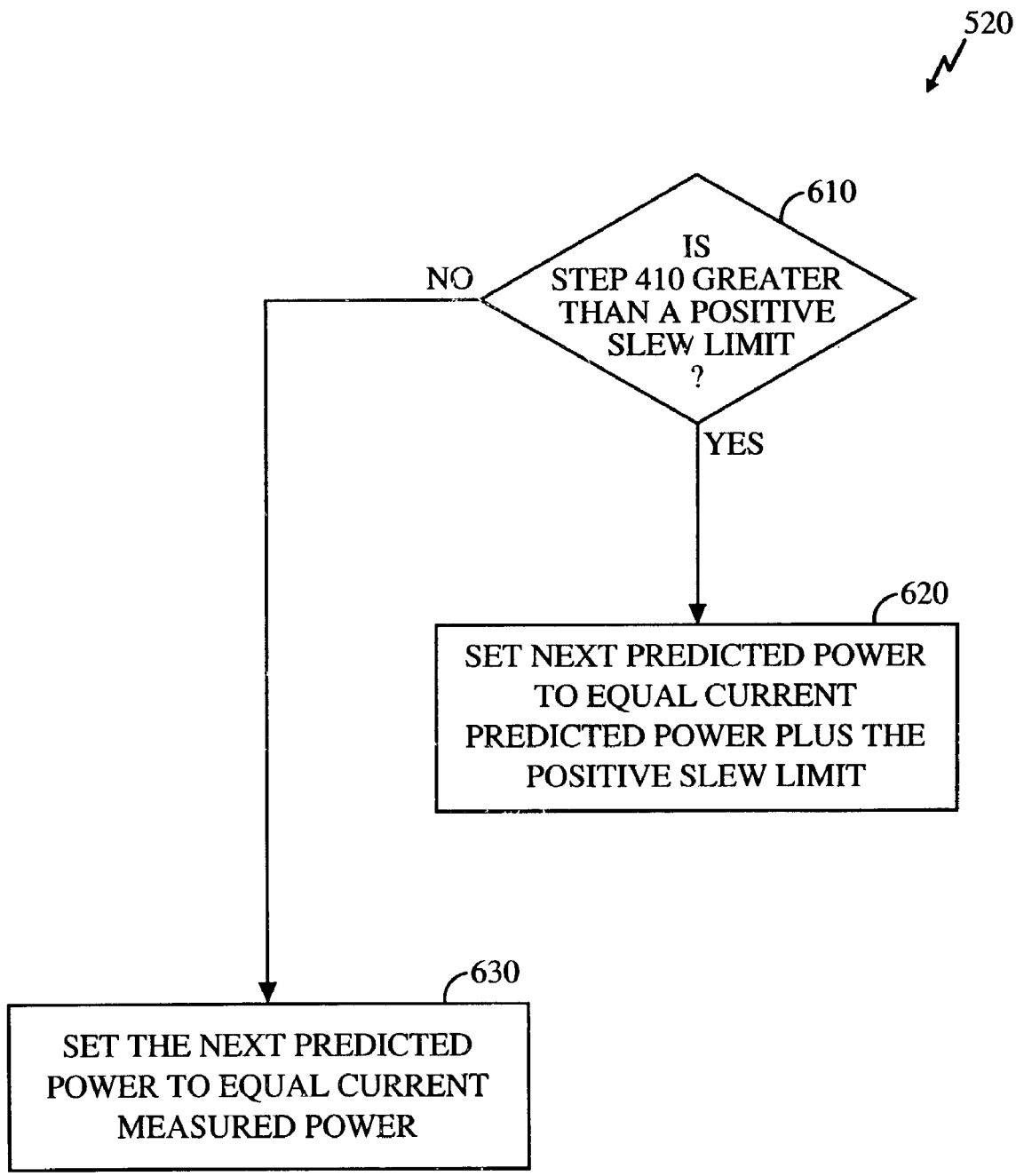
FIG. 6 is a flow chart illustrating details of determining a next predicted power where an upper slew limit is used.

FIG. 6 illustrates details of step 520. In step 610, the results of step 410 are compared with a positive slew limit. If the result of step 410 is greater than a positive slew limit, then perform step 620. If the results of step 410 are less than the positive slew limit then perform step 630. In step 620, set the next predicted power to equal the current predicted power plus a positive slew limit. In step 630, set the next predicted power equal to the current received power.

A slew limited predictor provides a simple and effective way to predict the next received power. The predictor does not require a continuous signal to predict a future received signal and therefore can be used in a discontinuous communication system. The future signal strength is used to set receiver amplifier gain, eliminating the need, in non-predictive systems, for costly and complex circuitry to measure the received power and attempt to quickly set the required receiver gain as data is received. Finally, a slew limited predictor reduces the complexity and cost of the receiver amplifiers. Slew limiting bounds the predicted signal. Therefore, the receiver amplifiers do not need a sufficient dynamic bandwidth to amplify the entire potential range of received signal strengths, just the bounded range. This allows less expensive amplifiers to be used in the receiver.

While various embodiments of the present invention have been described above, it should be understood that they have been presented by way of example, and not limitation. It will be apparent to persons skilled in the relevant art(s) that various changes in form and detail can be made therein without departing from the spirit and scope of the invention.

For example, in addition to configurations using hardware, implementation of the invention may be embodied in software, disposed, for example, in a computer usable (e.g., readable) medium configured to store the software (i.e., a computer readable program code). The program code causes the enablement of the functions or fabrication, or both, of the systems and techniques disclosed herein. For example, this can be accomplished through the use of general programming languages (e.g., C or C++), hardware description languages (HDL) including Verilog HDL, VHDL, and so on, or other available programming and/or circuit (i.e., schematic) capture tools. The program code can be disposed in any known computer usable medium including semiconductor, magnetic disk, optical disk (e.g., CD-ROM, DVD-ROM) and as a computer data signal embodied in a computer usable (e.g., readable) transmission medium (e.g., carrier wave or any other medium including digital, optical, or analog-based medium). As such, the code can be transmitted over communication networks including the Internet and intranets.

It is understood that the functions accomplished and/or structure provided by the systems and techniques described above can be represented in a core (e.g., a microprocessor core) that is embodied in program code and may be transformed to hardware as part of the production of integrated circuits. Also, the system and techniques may be embodied as a combination of hardware and software. Thus, the present invention should not be limited by any of the above-described exemplary embodiments, but should be defined only in accordance with the following claims and their equivalents.

What is claimed is:

1. A method of predicting signal strength in a discontinuous transmission system, comprising:
    measuring the power of a current received signal;
    comparing the power from said measuring to a current predicted power;
    determining a next predicted power from said comparing; and
    setting the gain of an amplifier based on the next predicted power from said determining;
    wherein said comparing comprises determining a power difference by subtracting the power from said measuring from a current predicted power, and wherein said determining comprises:
        setting the next predicted power equal to said currently predicted power less a negative slew limit if the difference from said comparing is positive and greater than said negative slew limit; and
        setting the next predicted power equal to the power from said measuring if the difference from said comparing is less than or equal to said negative slew limit.

2. The method of claim 1, wherein step (d) comprises:
    setting gain state of a plurality of coupled amplifiers based on the next predicted power from said determining.

3. A method of predicting signal strength in a discontinuous transmission system, comprising:
    measuring the power of a current received signal;
    comparing the power from said measuring to a current predicted power;
    determining a next predicted power from said comparing; and
    setting the gain of an amplifier based on the next predicted power from said determining;
    wherein said comparing comprises determining a power difference by subtracting the power from said measuring from a current predicted power and wherein said determining comprises:
        setting the next predicted power equal to said currently predicted power plus a positive slew limit if the difference from said comparing is negative and its magnitude is greater than the positive slew limit; and setting the next predicted power equal to the power from said measuring if the difference from said comparing is negative and its magnitude is less than or equal to the positive slew limit.

4. A predictor, comprising:
measuring means for measuring the power of a currently received signal;
comparing means for obtaining a power difference between said currently measured power and a current predicted power;
determining means for determining a next predicted power; and
gain setting means for setting the gain of an amplifier based on said next predicted power;
wherein said comparing means comprises further determining means for determining a power difference by subtracting the power from said measuring means from a current predicted power, and wherein said determining means comprises:
next predicted power setting means for setting the next predicted power equal to said currently predicted power less a negative slew limit if the difference from said comparing means is positive and greater than said negative slew limit; and
further next predicted power setting means for setting the next predicted power equal to the power from said measuring means if the difference from said comparing means is less than or equal to said negative slew limit.

5. A predictor, comprising:
measuring means for measuring the power of a currently received signal;
comparing means for obtaining a power difference between said currently measured power and a current predicted power;
determining means for determining a next predicted power; and
gain setting means for setting the gain of an amplifier based on said next predicted power;
wherein said comparing means comprises further determining means for determining a power difference by subtracting the power from said measuring means from a current predicted power, and wherein said determining means comprises:
next predicted power setting means for setting the next predicted power equal to said currently predicted power plus a positive slew limit if the difference from said comparing means is negative and its magnitude is greater than the positive slew limit; and
further next predicted power setting means for setting the next predicted power equal to the power from said measuring means if the difference from said comparing means is negative and its magnitude is less than or equal to the positive slew limit.

6. A non-transitory computer readable medium comprising code configured to predict a next received signal power, the code comprising:
code for measuring a current received signal power;
code for comparing a power difference between the current measured power and a current predicted power;
code for determining a next predicted power; and
code for setting the gain of a low noise amplifier based on said next predicted power;
wherein said code for comparing comprises code for determining a power difference by subtracting the power from said code for measuring from a current predicted power, and wherein said code for determining the next predicted power comprises:
code for setting the next predicted power equal to said currently predicted power less a negative slew limit if the power difference is positive and greater than said negative slew limit; and
code for setting said next predicted power equal to the power from said code for measuring if the power difference is less than or equal to said negative slew limit.

7. A non-transitory computer readable medium comprising code configured to predict a next received signal power, the code comprising:
code for measuring a current received signal power;
code for comparing a power difference between the current measured power and a current predicted power;
code for determining a next predicted power; and
code for setting the gain of a low noise amplifier based on said next predicted power;
wherein said code for comparing comprises code for determining a power difference by subtracting the power from said code for measuring from a current predicted power, and wherein said code for determining the next predicted power comprises:
code for setting the next predicted power equal to said current predicted power plus a positive slew limit if said power difference is greater than said positive slew limit; and
code for setting the next predicted power equal to said current measured power if said power difference is less than or equal to said positive slew limit.

8. A predictor, comprising:
a current received power input;
a next predicted power output;
a currently predicted power input;
a slew limit selector, capable of providing a slew limit signal; and
a comparator, coupled to said slew limit selector, to said next predicted power output, to said currently received power input and to said current predicted power input, wherein said comparator determines a next predicted power in response to a signal from said current predicted power input, said current received power input and said slew limit selector by setting the next predicted power equal to said current predicted power plus a positive slew limit if said power difference is greater than said positive slew limit, and setting the next power equal to said current measured power if said power difference is less than or equal to said positive slew limit.

9. The predictor of claim 8, further comprising:
an amplifier gain selector coupled to said next predicted power output, wherein said next predicted power sets an amplifier gain state; and
a delay element, coupled to said next predicted power output and said current predicted power input, wherein said delay element transforms the next predicted power into a current predicted power.

10. A predictor, comprising:
a current received power input;
a next predicted power output;
a currently predicted power input;
a slew limit selector, capable of providing a slew limit signal; and
a comparator, coupled to said slew limit selector, to said next predicted power output, to said currently received power input and to said current predicted power input, wherein said comparator determines a next predicted power in response to a signal from said current predicted power input, said current received power input and said slew limit selector by setting the next predicted power equal to said current predicted power plus a positive slew limit if said power difference is greater than said positive slew limit and setting the next predicted power equal to said current measured power if said power difference is less than or equal to said positive slew limit.

* * * * *